United States Patent
Takagi et al.

(10) Patent No.: US 7,596,299 B2
(45) Date of Patent: Sep. 29, 2009

(54) HARD DISK RECORDER

(75) Inventors: Toshihiro Takagi, Daito (JP); Kazuhiko Tani, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1218 days.

(21) Appl. No.: 10/863,199

(22) Filed: Jun. 9, 2004

(65) Prior Publication Data

US 2004/0247286 A1  Dec. 9, 2004

(30) Foreign Application Priority Data

Jun. 9, 2003  (JP)  ............... 2003-163209

(51) Int. Cl.
- H04N 5/00 (2006.01)
- H04N 5/91 (2006.01)
- H04N 7/00 (2006.01)
- G11B 19/02 (2006.01)
- G11B 27/10 (2006.01)

(52) U.S. Cl. .............. 386/68; 386/46; 386/95; 386/125; 386/126; 369/47.32; 369/47.35

(58) Field of Classification Search ............... 386/68, 386/46, 95, 125, 126, E5.001, E5.052; 369/47.32, 369/47.35

See application file for complete search history.

(56) References Cited

U.S. PATENT DOCUMENTS

| | | | |
|---|---|---|---|
| 5,920,675 | A | 7/1999 | Adolph et al. |
| 6,477,123 | B1 * | 11/2002 | Hutter .................... 369/47.32 |
| 2003/0016944 | A1 * | 1/2003 | Kato ........................ 386/46 |
| 2003/0215222 | A1 * | 11/2003 | Kawasaki .................. 386/125 |

FOREIGN PATENT DOCUMENTS

| | | |
|---|---|---|
| DE | 195 43 017 A1 | 5/1997 |
| DE | 197 13 286 A1 | 10/1998 |
| DE | 100 32 722 A1 | 1/2002 |
| EP | 0 993 189 A2 | 4/2000 |
| EP | 0993189 A2 * | 12/2000 |
| JP | 3042840 | 8/1997 |
| JP | 2001-060304 | 3/2001 |

OTHER PUBLICATIONS

German Office Action including English translation dated Jun. 10, 2008 (Five (5) pages).

* cited by examiner

*Primary Examiner*—Thai Tran
*Assistant Examiner*—Syed Y Hasan
(74) *Attorney, Agent, or Firm*—Crowell & Moring LLP

(57) ABSTRACT

A hard disk recorder 1 is capable of performing fast-forward reproductions at 120× speed, 60× speed and 30× speed, and reproduces video images and audio sounds in a series of periodic reproduction zones in a video and audio file, each reproduction zone being for a predetermined reference time interval (e.g. 1 second), while skipping video images and audio sounds in other than the reproduction zones according to a ratio of the fast-forward speed to the predetermined reference time interval (skipping for 119 seconds at the 120× speed, 59 seconds at the 60× speed, and 29 seconds at the 30× speed, respectively). Each of the series of reproduction zones for the 120× speed, the series of reproduction zones for the 60× speed, and the series of reproduction zones for the 30× speed, each reproduction zone of which is for the reference time interval, is so set as to be free from overlap with the other series of reproduction zones. This hard disk recorder enables users to quickly find a target scene desired to view, and has improved handleability in searching for the target scene.

6 Claims, 5 Drawing Sheets

HARD DISK RECORDER

BACKGROUND OF THE INVENTION

1. Field of the Invention

The present invention relates to a hard disk recorder.

2. Description of the Related Art

Conventionally, in a hard disk recorder, video image-related data and audio sound-related data in video and audio information files are read from a built-in hard disk, as a recording medium, to generate video signals and audio signals. The video signals are output to a display, while the audio signals are output to a loudspeaker, whereby video images are reproduced on the display, while audio sounds are reproduced by the loudspeaker.

Generally, a hard disk recorder has a fast-forward reproduction function to reproduce video images and audio sounds in fast-forward mode, and can reproduce video images and audio sounds at plural fast-forward speeds. In such hard disk recorder having the fast-forward reproduction function, it is known to perform the fast-forward reproduction in a manner that video images and audio sounds are periodically reproduced each time for a given reference time interval (e.g. 1 second) by being periodically skipped each time for a time interval (e.g. 119 seconds in the case of 120× speed) corresponding to the fast-forward reproduction speed relative to the reference time interval.

Each periodic reproduction zone for the reference time interval is determined using, as a base point, a starting position of a fast-forward reproduction in a video and audio information file (often referred to as video and audio file hereafter). For example, in the case where the reference time interval for reproduction is 1 second, and the fast-forward reproduction is performed at 120× speed from the beginning of a video and audio information file, then consecutive reproduction of video images and audio sounds in periodic reproduction zones is performed in a manner that the periodic reproduction zones are each of 1 second interval and are positioned at time points corresponding to 120 seconds, 240 seconds, 360 seconds and so on from the base point in the case of normal reproduction.

In order to search for a target scene desired to view, it is a general way to perform a fast-forward reproduction. However, according to the above-described conventional hard disk recorder, the fast-forward reproduction of video images and audio sounds in periodic zones in a video and audio information file is performed, each periodic zone being for a reference time interval, while the other video images and audio sounds in the other periodic zones, each for a time interval corresponding to the fast-forward speed, are skipped. Thus, there are scenes which are not reproduced by the fast-forward reproduction. Accordingly, in the case of a fast-forward reproduction at a very high speed such as 120× speed, there is a high probability that the fast-forward reproduction is performed till the end of a video and audio information file without reproducing a target scene, thereby making it impossible to find the target scene. On the other hand, in the case of a fast-forward reproduction at a relatively slow speed such as double (2×) speed, there is an increased probability of finding a target scene, but it is likely to take too much time to find a target scene from a video and audio information file in its entirety.

In the conventional hard disk recorder as described above, each periodic reproduction zone for the reference time interval is determined using the starting position of the fast-forward reproduction as a base point. Accordingly, if fast-forward reproductions are repeated each time from one same position of reproduction in a video and audio information file at one same fast-forward speed, then same scenes are repeatedly reproduced by the fast-forward reproductions. Thus, if a target scene is not reproduced by e.g. a fast-forward reproduction at 120× speed from the beginning to the end of a video and audio information file, then the target scene is never reproduced by the fast-forward reproduction at the same 120× speed, no matter how many times the fast-forward reproductions are repeated each time from the beginning to the end of the video and audio information file. Accordingly, in order to search for the target scene in such case, it becomes necessary to perform a fast-forward reproduction at a speed different from the 120× speed. This makes the hard disk recorder inconvenient for users to use.

In addition, if the 120× speed is changed in this case to e.g. 60× speed, and the fast-forward reproduction is performed at the 60× speed from the beginning of the video and audio information file, the following problem arises. As described above, each periodic reproduction zone for the reference time interval is determined using, as a base point, a starting position of a fast-forward reproduction in a video and audio information file. Accordingly, video images and audio sounds, which are positioned at time points corresponding to 120 seconds, 240 seconds, 360 seconds and so on from the base point in the case of normal reproduction and which are reproduced at the 60× speed, unavoidably overlap with video images and audio sounds reproduced at the 120× speed. The video images and audio sounds reproduced at the 60× speed, which overlap with those reproduced at the 120× speed, are not useful information anymore to search for a target scene, as the target scene is not contained in the video images and audio sounds reproduced by the fast-forward reproduction at the 120× speed from the beginning to the end of the video and audio information file.

In other words, in the case where the fast-forward reproduction is performed from the beginning of the video and audio information file at e.g. the 60× speed in place of the 120× speed, information unneeded to search for a target scene are uselessly reproduced, thereby lowering the probability of finding the target scene. Such problem can occur in the fast-forward reproduction not only in the case where the 120× speed is changed to the 60× speed, but also in the case where any arbitrary speed is changed to another arbitrary speed.

Thus, the conventional hard disk recorder makes it difficult to quickly find a target scene desired to view, and is poor to handle to find the target scene. This makes the hard disk recorder inconvenient for users to use.

SUMMARY OF THE INVENTION

An object of the present invention is to provide a hard disk recorder that enables users to quickly find a target scene desired to view, and has improved handleability in searching for the target scene.

A hard disk recorder according to an aspect of the present invention comprises: reading means to read video image-related data from a recording medium having, as image-related information files, series of the video image-related data recorded thereon; video signal generating means to generate video signals for reproduction of video images on a display on the basis of the video image-related data read by the reading means; reproduction control means to control the reading means and the video signal generating means for reproducing the video images on the display; and fast-forward reproduction means to perform, under the control of the reproduction control means, a fast-forward reproduction of the video images in a series of periodic reproduction zones at a fast-forward speed, each periodic reproduction zone being for a predetermined reference time interval, while video images in other than the periodic reproduction zones are skipped according to a ratio of the fast-forward speed to the predetermined reference time interval.

Therein, when the fast-forward reproduction means performs a first time fast-forward reproduction of the video images in a first series of periodic reproduction zones at a first fast-forward speed, and thereafter performs, at the same fast-forward speed, a second fast-forward reproduction of the video images in a second series of periodic reproduction zones, then the second series of periodic reproduction zones are free from overlap with the first series of periodic reproduction zones.

According to the hard disk recording having such configuration, in the case where the same video image-related file as that reproduced in the first time fast-forward reproduction at a fast-forward speed is reproduced in the second time fast-forward reproduction at the same fast-forward speed, the video images reproduced by the second time fast-forward reproduction are free from overlap with those reproduced by the first time fast-forward reproduction, while video images not reproduced by the first time fast-forward reproduction are reproduced by the second time fast-forward reproduction. Thus, without need for a user to change the fast-forward speed, a target scene can be found by repeating fast-forward reproduction at the same fast-forward speed.

Preferably, when the second time fast-forward reproduction of the video images is performed at the same fast-forward speed as that in the first time fast-forward reproduction, the second series of periodic reproduction zones is equivalent to and is shifted in position by a predetermined shift amount from the first series of periodic reproduction zones.

Further preferably, the fast-forward reproduction means is capable of performing the fast-forward reproduction of the video images at a fast-forward speed selected from plural fast-forward speeds.

Still further preferably, the hard disk recorder further comprises a fast-forward reproduction memory to preliminarily store data indicating plural series of periodic reference reproduction zones for fast-forward reproduction of the video images, respectively, each periodic reference reproduction zone in each series of periodic reference reproduction zones being for the reference time interval, wherein each of the plural series of periodic reference reproduction zones is set with a starting position of each of the video image-related information files being used as a base point, wherein the plural series of periodic reference reproduction zones are set corresponding to the plural fast-forward speeds, respectively, in a manner that the plural series of periodic reference reproduction zones are free from overlap with one another, and wherein the fast-forward reproduction means performs the fast-forward reproduction of the video images at a fast-forward speed selected from the plural fast-forward speeds in one of the plural series of periodic reference reproduction zones which is stored in the fast-forward reproduction memory and which corresponds to the selected fast-forward speed, each periodic reproduction zone in the one of the plural series of periodic reference reproduction zones being for the reference time interval.

According to the hard disk recording having such configuration, in the case where the same video image-related file as that reproduced in the first time fast-forward reproduction at a fast-forward speed is reproduced in the second time fast-forward reproduction at a different fast-forward speed, then video images in one of the preliminarily set series of periodic reference reproduction zones corresponding to one of the fast-forward speeds are so reproduced as to be free from overlap with each of the other preliminarily set series of periodic reference reproduction zones corresponding to the each of the other fast-forward speeds. Accordingly, the video images reproduced by the second time fast-forward reproduction are free from overlap with those reproduced by the first time fast-forward reproduction, while video images not reproduced by the first time fast-forward reproduction are reproduced by the second time fast-forward reproduction. Thus, in the case where fast-forward reproductions in one video image-related file are repeated with varied fast-forward speeds for the purpose of finding a target scene from the same video image-related file, it can be avoided to uselessly reproduce unneeded video images, thereby increasing the probability of finding the target scene.

A hard disk recorder according to another aspect of the present invention comprises: reading means to read video image-related data from a recording medium having, as image-related information files, series of the video image-related data recorded thereon; video signal generating means to generate video signals for reproduction of video images on a display on the basis of the video image-related data read by the reading means; reproduction control means to control the reading means and the video signal generating means for reproducing the video images on the display; fast-forward reproduction means to perform, under the control of the reproduction control means, a fast-forward reproduction of the video images in a series of periodic reproduction zones at a fast-forward speed, each periodic reproduction zone being for a predetermined reference time interval, while video images in other than the periodic reproduction zones are skipped according to a ratio of the fast-forward speed to the predetermined reference time interval; operating means to be operated by a user to command a fast-forward reproduction of the video images in an arbitrary one of the video image-related information files recorded on the recording medium; and a fast-forward reproduction memory to preliminarily store data indicating plural series of periodic reference reproduction zones for fast-forward reproduction of the video images, respectively, each periodic reference reproduction zone in each series of periodic reference reproduction zones being for the reference time interval.

Therein, the fast-forward reproduction means is capable of performing the fast-forward reproduction of the video images at a fast-forward speed selected from plural fast-forward speeds.

Therein, each of the plural series of periodic reference reproduction zones is set with a starting position of each of the video image-related information files being used as a base point.

Therein, the plural series of periodic reference reproduction zones are set corresponding to the plural fast-forward speeds, respectively, in a manner that the plural series of periodic reference reproduction zones are free from overlap with one another.

Therein, [1] in the case where, after a first time fast-forward reproduction of the video images in one of the video image-related information files at first one of the fast-forward speeds, a second time fast-forward reproduction of the video images in the same one of the video image-related information files at an arbitrary one of the fast-forward speeds is commanded by the operating means, then:

(i) in the case where the arbitrary one of the fast-forward speeds in the commanded second time fast-forward reproduction is a second one, different from the first one, of the fast-forward speeds, the fast-forward reproduction means performs the second time fast-forward reproduction of the video images at the second one of the fast-forward speeds in one of the plural series of periodic reference reproduction zones which corresponds to the second one of the fast-forward speeds, each periodic reproduction zone in the one of the plural series of periodic reference reproduction zones being for the reference time interval; or (ii-a) in the case where the arbitrary one of the fast-forward speeds in the commanded second time fast-forward reproduction is the same as the first one of the fast-forward speeds, the fast-forward reproduction means performs the second time fast-forward reproduction of the video images at the same speed as the first one of the fast-forward speeds in a second series of periodic reference reproduction zones being equivalent to and being shifted in position by a predetermined shift amount from the one of the plural series of periodic reference reproduction zones which corresponds to the first one of the fast-forward speeds, each periodic reproduction zone in the second series of periodic reference reproduction zones being for the reference time interval, and (ii-b) in the case where, after the second time fast-forward reproduction of the video images in the same one of the video image-related information files at the same one of the fast-forward speeds as in the second time fast-forward reproduction, a further time fast-forward reproduction of the video images in the same one of the video image-related information files at the same one of the fast-forward speeds is repeatedly commanded by the operating means, then the fast-forward reproduction means performs the further time fast-forward reproduction of the video images at the same one of the fast-forward speeds in a further series of periodic reference reproduction zones which is equivalent to the second series of periodic reference reproduction zones and which is further shifted in position by the predetermined shift amount from the second series of periodic reference reproduction zones, each periodic reproduction zone in the further series of periodic reference reproduction zones being for the reference time interval, or

[2] in the case where, after a first time fast-forward reproduction of the video images in one of the video image-related information files, a second time fast-forward reproduction of the video images in a second one, different from the first one, of the video image-related information files at a further arbitrary one of the fast-forward speeds is commanded by the operating means, then the fast-forward reproduction means performs the second time fast-forward reproduction of the video images at the further arbitrary one of the fast-forward speeds in one of the plural series of periodic reference reproduction zones which corresponds to the further arbitrary one of the fast-forward speeds, each periodic reproduction zone in the one of the plural series of periodic reference reproduction zones being for the reference time interval.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

An embodiment of the present invention will be described hereinafter with reference to the drawings.

Figure 1:
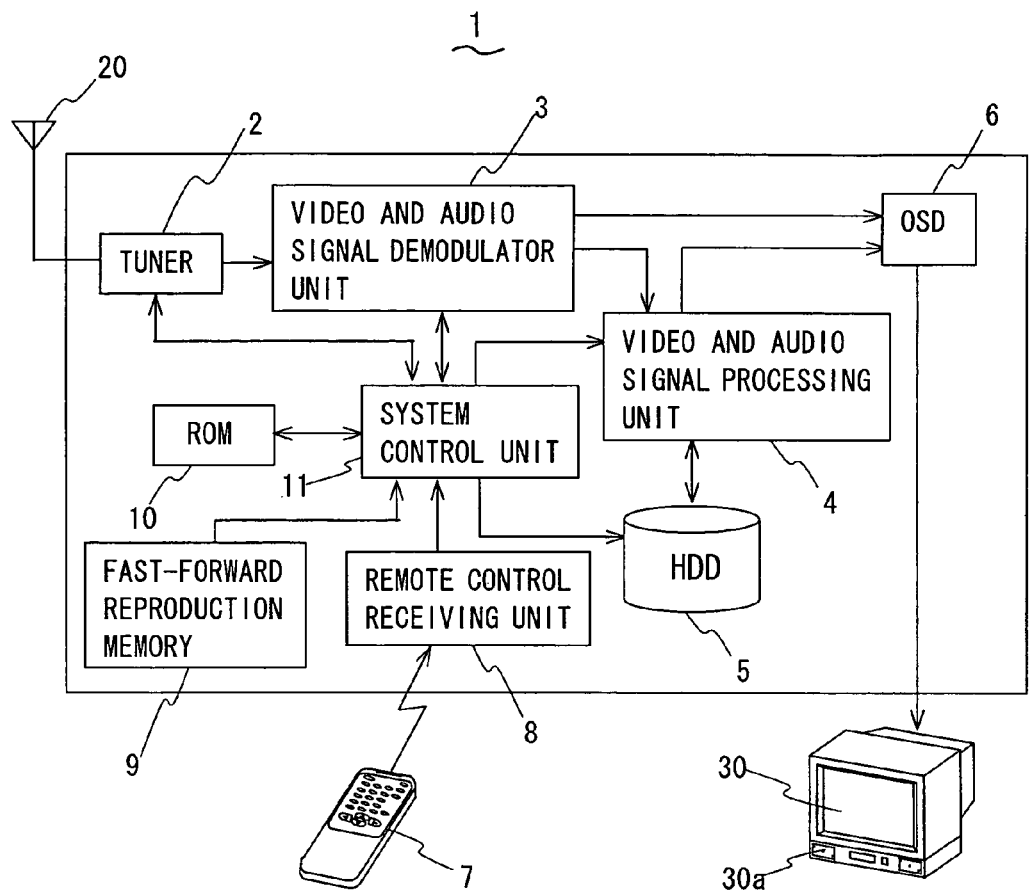
FIG. 1 is a schematic electrical block diagram showing a hard disk recorder according to an embodiment of the present invention.

Referring to FIG. 1, a hard disk recorder 1 receives television broadcast signals through an antenna 20 connected to the hard disk recorder 1, the television broadcast signals being broadcast from a broadcasting station. In the hard disk recorder 1, video images and audio sounds from the television broadcast are recorded on a hard disk which is a built-in recording medium in a HDD (hard disk drive) 5, while video images and audio sounds recorded on the hard disk are reproduced by a display 30 and a loudspeaker 30a connected to the hard disk recorder 1.

The hard disk recorder 1 comprises: a tuner 2; a video and audio signal demodulator unit 3; a video and audio signal processing unit (video signal generating means) 4; an HDD 5; an OSD (on screen display) processing unit 6; a remote control (operating means) 7; a remote control receiving unit 8; a fast-forward reproduction memory 9; a ROM (read only memory) 10; and a system control unit (reproduction control means and fast-forward reproduction means) 11 to control the hard disk recorder 1 in its entirety.

Under the control of the system control unit 11, the tuner 2 receives television broadcast signals through the antenna 20 by tuning its receive frequency to the frequency of the television broadcast signals broadcast from a broadcasting station.

Under the control of the system control unit 11, the video and audio signal demodulator unit 3 demodulates the television broadcast signals received by the tuner 2, and generates video and audio signals. The video and audio signals generated by the video and audio signal demodulator unit 3 are output to the display 30 and the loudspeaker 30a through the OSD processing unit 6. Thus, the video images and audio sounds of the television broadcast are reproduced by the display 30 and the loudspeaker 30a. In addition, the video and audio signals generated by the video and audio signal demodulator unit 3 are output to the video and audio signal processing unit 4.

Under the control of the system control unit 11, the video and audio signal processing unit 4 converts the video and audio signals generated by the video and audio signal demodulator unit 3 into video image-related and audio sound-related data in a given format, and outputs the thus obtained data to the HDD 5. Furthermore, under the control of the system control 11, the video and audio signal processing unit 4 generates video and audio signals on the basis of the video image-related and audio sound-related data output from the HDD 5. The video and audio signals thus generated by the video and audio signal processing unit 4 are output to the display 30 and the loudspeaker 30a through the OSD processing unit 6. Thus, the video images and audio sounds on the basis of the video image-related and audio sound-related data recorded on the HDD 5 are reproduced by the display 30 and the loudspeaker 30a.

Figure 2:
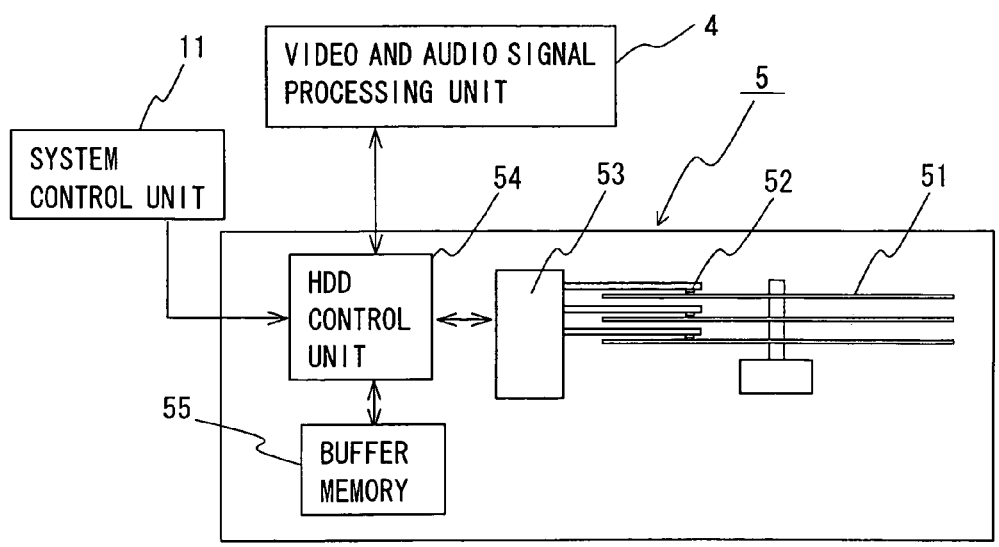
FIG. 2 is a schematic electrical block diagram showing a hard disk drive in the same hard disk recorder.

The HDD 5 records thereon the video image-related and audio sound-related data in a manner that such data can be read therefrom. As shown in FIG. 2, the HDD 5 comprises: a plurality of hard disks 51 each as a recording medium; a plurality of magnetic heads 52 to record and read data on and from these hard disks 51; a head drive unit 53 to drive the magnetic heads 52; an HDD control unit 54 to control the head drive unit 53 for controlling the recording and reading of data on and from the hard disks 51; and a buffer memory 55 to temporarily store data to record or data having been read. The magnetic heads 52, the head drive unit 53 and the HDD control unit 54 constitute reading means to read video image-related and audio sound-related data from the hard disks 51.

Under the control of the system control unit 11, the HDD 5 records, on the hard disks 51, a series of video image-related and audio sound-related data output from the video and audio signal processing unit 4 as one video and audio file (information file). Furthermore, under the control of the system control unit 11, the HDD 5 reads video image-related and audio sound-related data recorded on the hard disks 51, and outputs the thus read data to the video and audio signal processing unit 4.

Under the control of the system control unit 11, the OSD processing unit 6 superimposes various on-screen display signals on the video signals output from the video and audio signal demodulator unit 3 and the video and audio signal processing unit 4. Thereby, video images, having images in accordance with the on-screen display signals superimposed thereon, are displayed on the display 30.

Figure 3:
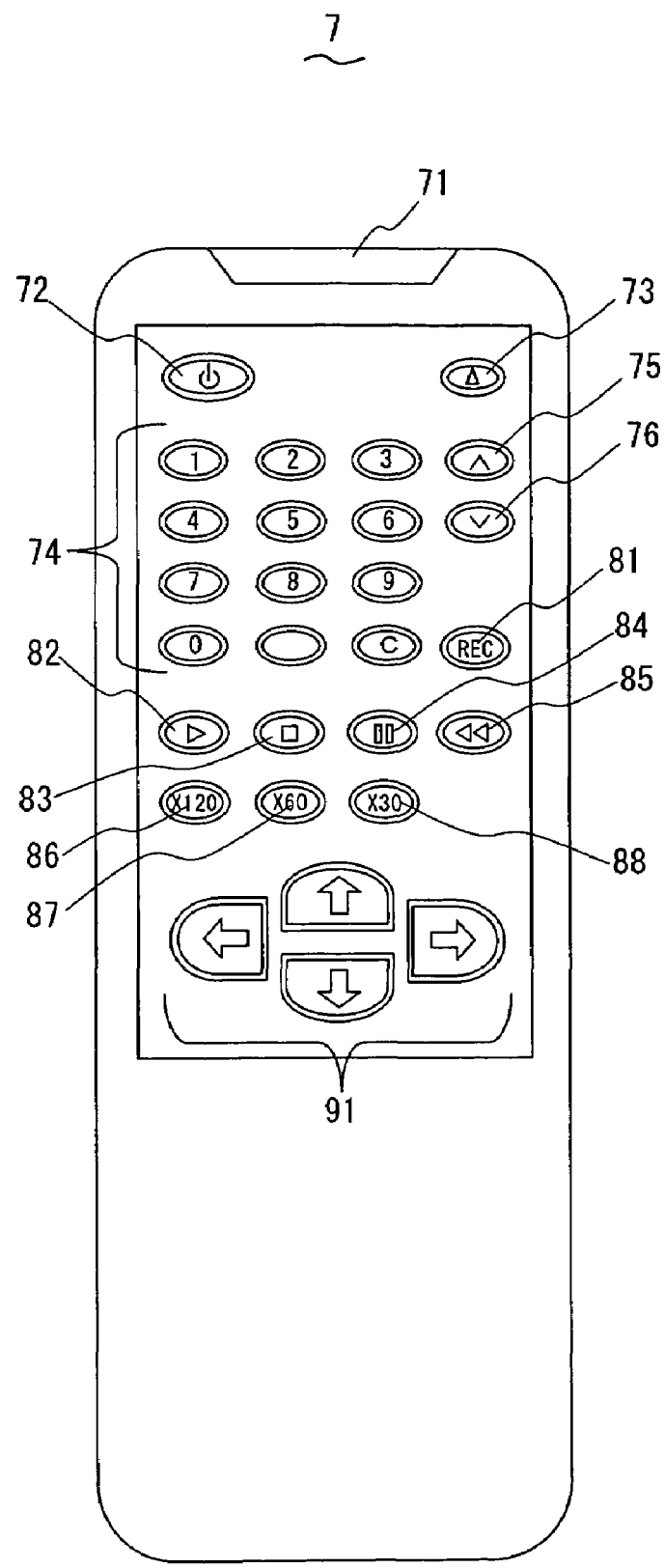
FIG. 3 is a schematic plan view showing a remote control in the same hard disk recorder, having operation keys.

The remote control 7 is provided to perform various operations of the hard disk recorder 1. As shown in FIG. 3, the remote control 7 comprises a power supply key 72, a menu key 73, numeric keys 74, a volume up key 75 and a volume down key 76. The remote control 7 further comprises a REC (record) key 81, a reproduction (playback) key 82, a stop key 83, a pause key 84, a rewind reproduction (rewind playback) key 85, fast-forward reproduction (fast-forward playback) keys 86, 87 and 88, and a cursor key 91. When these operating keys of the remote control 7 are pressed one at a time, infrared code signals corresponding to the operating keys, respectively, are transmitted from a light emitting unit 71.

The power supply key 72 is provided to switch on and off a power supply of the hard disk recorder 1. The menu key 73 is a key to display, on the display 30, a menu screen to select and command various operations of the hard disk recorder 1. The numeric keys 74 are keys for e.g. selection of television broadcast signals. The volume up key 75 is a key to increase volume, while the volume down key 76 is a key to decrease volume.

The REC key 81 is a key to record, on the hard disks 51, the video images and audio sounds, while they are being received from the television broadcast. The reproduction key 82 is a key to normally reproduce video images and audio sounds recorded on the hard disks 51. The stop key 83 is a key to stop the reproduction of video images and audio sounds. The pause key 84 is a key to pause video images and audio sounds while they are being reproduced. The rewind reproduction key 85 is a key to reproduce, in rewind direction (toward beginning of the video and audio file), video images and audio sounds recorded on the hard disks 51. The fast-forward reproduction keys 86, 87 and 88 are keys to reproduce video images and audio sounds, recorded on the hard disks 51, in forward direction (toward ending of the video and audio file) at speeds 120 times, 60 times and 30 times as fast as the speed in the case of the normal reproduction, respectively. In the present specification, these speeds are often referred to as 120× speed, 60× speed and 30× speed, respectively. The cursor key 91 is a key to be used for operations on a menu screen such as moving a cursor, selecting items and selecting video and audio files.

The remote control receiving unit 8 receives the infrared signals transmitted from the remote control 7, and converts them to electric signals. The remote control receiving unit 8 further outputs, to the system control unit 11, signals corresponding to operations of the remote control 7. The fast-forward reproduction memory 9 stores various data needed for fast-forward reproduction of video images and audio sounds recorded on the hard disks 51. The ROM 10 stores operating programs of the system control unit 11. In response to the operation of the remote control 7, the system control unit 11 controls the recording of the video images and audio sounds from the television broadcast onto the hard disks 51, and also controls the normal reproduction, rewind reproduction and fast-forward reproduction of video images and audio sounds recorded on the hard disks 51 as well as controls other operations of the hard disk recorder 1.

In the following, it will be described how fast-forward reproductions of video images and audio sounds are performed. A fast-forward reproduction of the video images is performed in a manner that video images and audio sounds in a series of periodic reproduction zones are consecutively reproduced at a fast-forward speed, each periodic reproduction zone being for a predetermined reference time interval, while video images and audio sounds in other than the periodic reproduction zones are skipped according to a ratio of the fast-forward speed to the predetermined reference time interval. This fast-forward reproduction can be more specifically described as follows, based the condition that according to the present embodiment, the reference time interval is set to be 1 second. In the case of 120× speed, the system control unit 11 repeats reproduction, each for one second, of video images and audio sounds, while skipping video images and audio sounds for an interval of 119 seconds each time. In the case of 60× speed, the system control unit 11 repeats reproduction, each for one second, of video images and audio sounds, while skipping video images and audio sounds for an interval of 59 seconds each time. Furthermore, in the case of 30× speed, the system control unit 11 repeats reproduction, each for one second, of video images and audio sounds, while skipping video images and audio sounds for an interval of 29 seconds each time.

Plural series of periodic reproduction zones (plural series of periodic fast-forward reproduction zones) in fast-forward reproduction of video images and audio sounds, each reproduction zone being for the reference time interval (for 1 second), are determined on the basis of preliminarily set series of periodic reference reproduction zones and on the basis of a predetermined shift amount for shifting the series of periodic reproduction zones.

Figure 4:
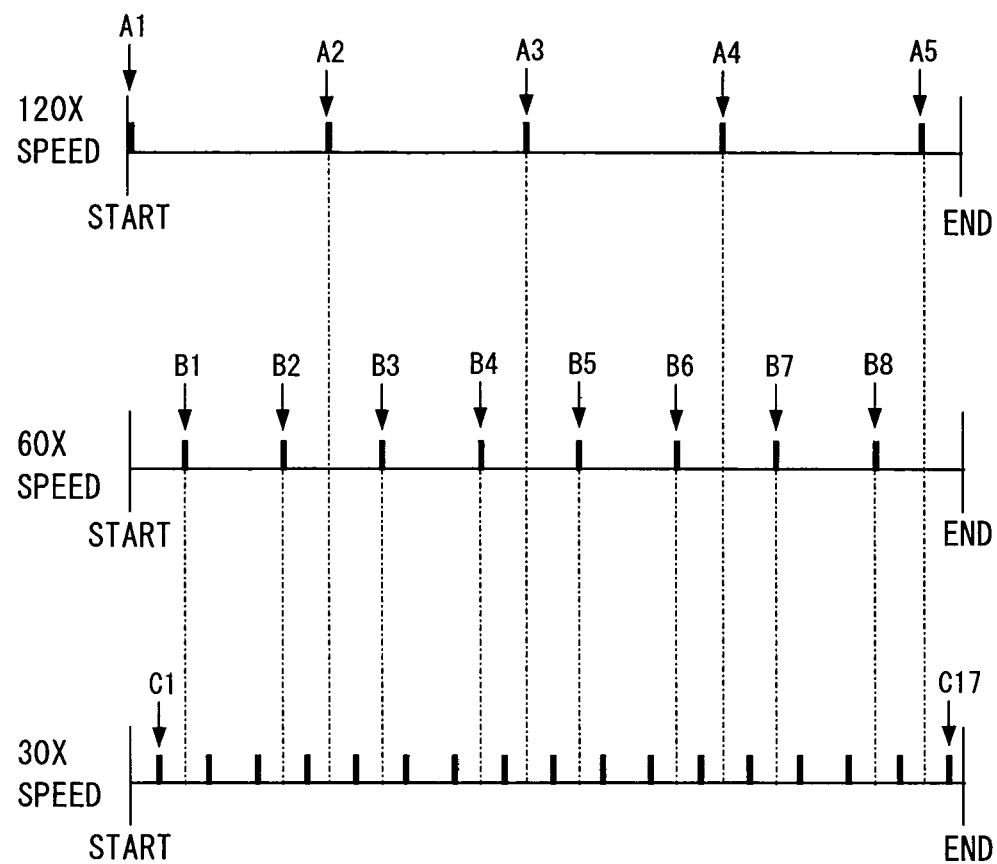
FIG. 4 is a schematic image chart to explain periodic reproduction zones of video images and audio sounds in a video and audio information file in the same hard disk recorder.

As shown in FIG. 4, each of the plural series of periodic reference reproduction zones is set, with a starting position of each of the video and audio files being used as a base point, in a manner that the plural series of periodic reference reproduction zones are set corresponding to the plural fast-forward speeds, respectively, and that the plural series of periodic reference reproduction zones are free from overlap with one another. In FIG. 4, reference symbols A1 to A5 designate a series of periodic reference reproduction zones in the case of 120× speed. According to the present embodiment, the periodic reference reproduction zones A1 to A5 are set at a zone from 0 to 1 second, a zone from 120 to 121 seconds, a zone from 240 to 241 seconds, and so on, respectively, with a starting position of each of the video and audio video files being used as a base point. Further, the reference symbols B1 to B8 designate a series of periodic reference reproduction zones in the case of 60× speed. According to the present embodiment, the periodic reference reproduction zones B1 to B8 are set at a zone from 30 to 31 seconds, a zone from 90 to 91 seconds, a zone from 150 to 151 seconds, and so on, respectively, with a starting position of each of the video and audio video files being used as a base point. Likewise, the reference symbols C1 to C17 designate a series of periodic reference reproduction zones in the case of 30× speed. According to the present embodiment, the periodic reference reproduction zones C1 to C17 are set at a zone from 15 to 16 seconds, a zone from 45 to 46 seconds, a zone from 75 to 76 seconds, and so on, respectively, with a starting position of each of the video and audio video files being used as a base point.

Assuming that a first time fast-forward reproduction is performed for one video and audio file at selected one of the three fast-forward speeds in one series of the three series of periodic reference reproduction zones which corresponds to the selected fast-forward speed, it is designed that:

(1) in the case where thereafter a second time fast-forward reproduction is performed for a different video and audio file at any selected one of the three fast-forward speeds, one series of the three series of periodic reference reproduction zones which corresponds to the selected fast-forward speed is used for the second time fast-forward reproduction, or (2) in the case where thereafter a second time fast-forward reproduction is performed for any one of video and audio files at a selected different one of the three fast-forward speeds than the fast-forward speed at the first time reproduction, one series of the three series of periodic reference reproductions zones which corresponds to the selected different fast-forward speed is used for the second time fast-forward reproduction.

On the other hand, assuming that a first time fast-forward reproduction is performed for one video and audio file at selected one of the three fast-forward speeds in one series of the three series of periodic reproduction zones corresponding to the selected fast-forward speed, and thereafter a second time fast-forward reproduction is performed for the same video and audio file at the same fast-forward speed, it is designed that a series of periodic reference reproduction zones which is equivalent to and is shifted by a predetermined shift amount Δ from the series of periodic reference reproduction zones at the first time fast-forward reproduction is used for the second time fast-forward reproduction. Onward in this way, it is designed that in the case where a further fast-forward reproduction is repeatedly performed for the same video and audio file at the same fast-forward speed as in each previous time fast-forward reproduction, a series of periodic reference reproduction zones which is equivalent to and is shifted by a predetermined shift amount Δ from the series of periodic reference reproduction zones at the previous time fast-forward reproduction is used for the further fast-forward reproduction.

Figure 5:
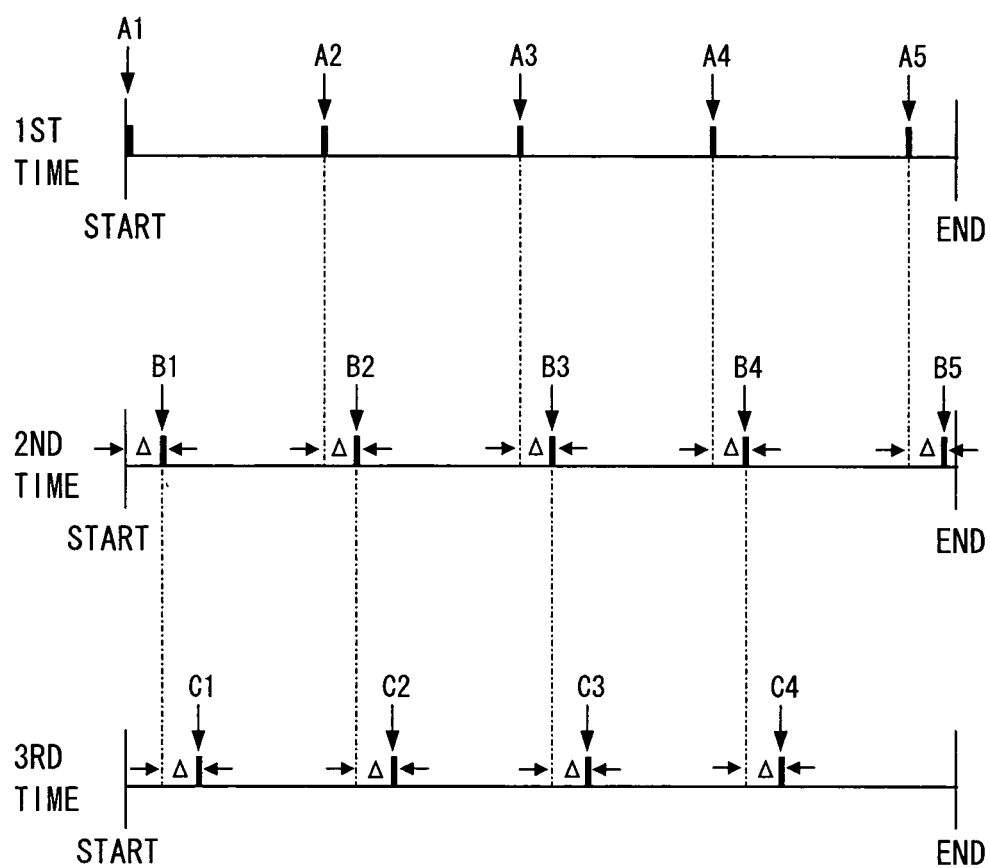
FIG. 5 is a further schematic image chart to explain periodic reproduction zones of video images and audio sounds in a video and audio information file in the same hard disk recorder.

According to the present embodiment, the predetermined shift amount Δ is set to be 5 seconds. More specifically, as shown in FIG. 5, in the case where a fast-forward reproduction of one same video and audio file is repeated at one same speed (e.g. 120× speed), a series of zones A1 to A5 is made as a series of periodic reproduction zones for a first time fast-forward reproduction, while a series of zones B1 to B5 which is equivalent to and is shifted by the shift amount Δ (5 seconds) from the series of zones A1 to A5 is made as a series of periodic reproduction zones for a second time fast-forward reproduction. Likewise, a series of zones C1 to C4 which is equivalent to and is shifted by the shift amount Δ (5 seconds) from the series of zones B1 to B4 is made as a series of periodic reproduction zones for a third time fast-forward reproduction. Onward in such way, each time a further fast-forward reproduction of the same video and audio file is repeated at the same speed, a series of periodic fast-forward reproduction zones which is equivalent to and is shifted by the shift amount Δ from each previous series of periodic fast-forward reproduction zones is made as a series of periodic reproduction zones for the further time fast-forward reproduction.

The fast-forward reproduction memory 9 preliminarily stores data indicating such plural series of periodic reference reproduction zones as well as data indicating such shift amount. The system control unit 11 controls operations of the video and audio signal processing unit 4 and the HDD 5 on the basis of the data indicating the plural series of periodic reference reproduction zones and on the basis of the data indicating the shift amount, both data being stored in the fast-forward reproduction memory 9, in such a manner as to each time reproduce video images and audio sounds in a series of periodic reproduction zones corresponding to a fast-forward speed for the each time, while skipping video images and audio sounds in other than the series of periodic reproduction zones.

Figure 6:
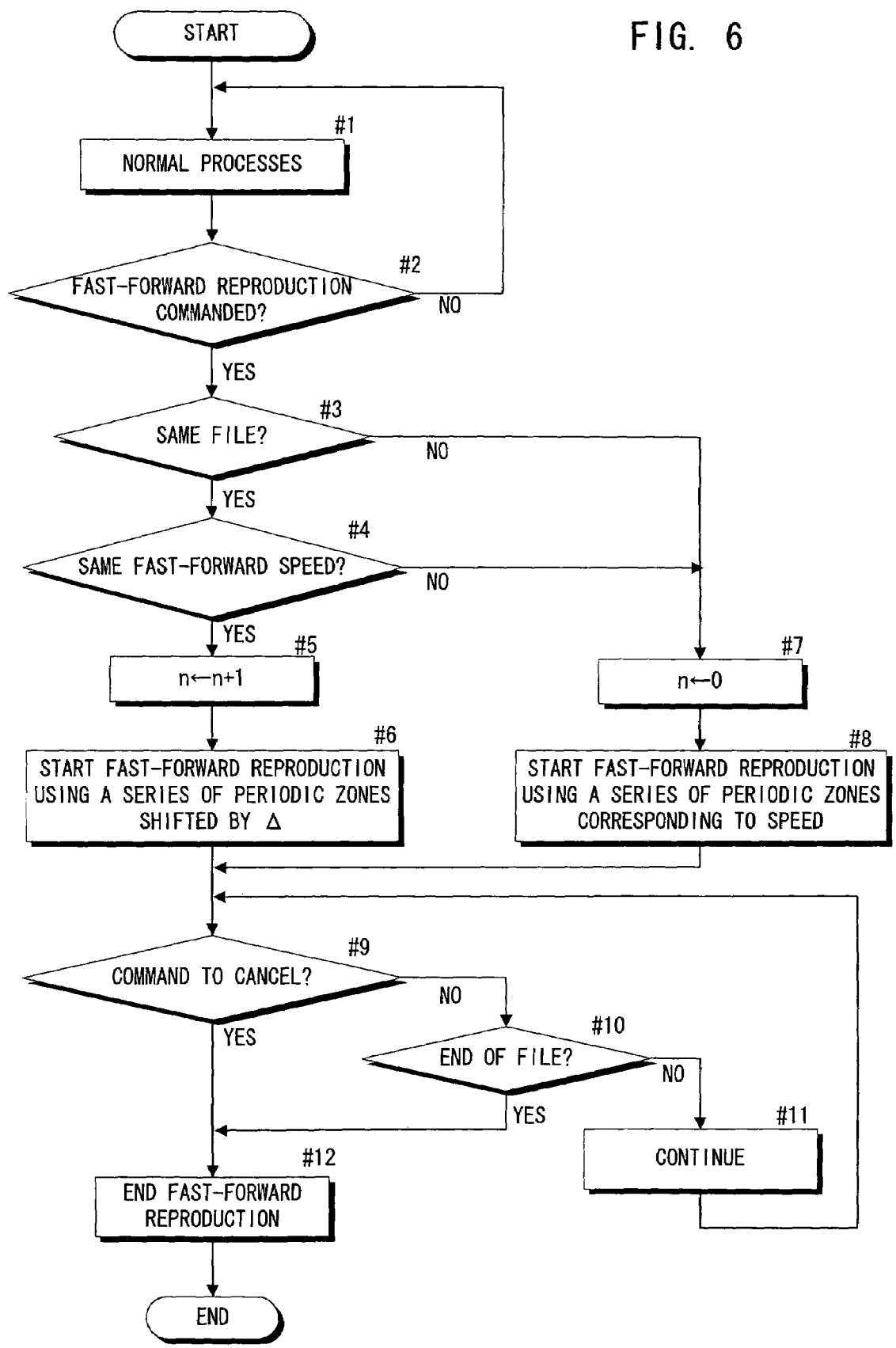
FIG. 6 is a schematic flow chart showing a process of fast-forward reproduction in the same hard disk recorder.

Next, referring to the flow chart of FIG. 6, it will be described how the hard disk recorder 1 having the above-described configuration performs fast-forward reproductions. To begin with, the system control unit 11 decides whether or not a fast-forward reproduction has been commanded (#2) by the remote control 7 during normal processes (#1) such as reproductions of video images and audio sounds (normal reproduction, rewind reproduction and fast-forward reproduction) or standby for various operation commands. The command of the fast-forward reproduction is performed either: by pressing one of the fast-forward reproduction keys 86, 87 and 88 during normal reproduction of a video and audio file; or by pressing e.g. the menu key 73 or the cursor key 91 during standby for the various operation commands to select a video and audio file, and then pressing one of the fast-forward reproduction keys 86, 87 and 88.

When the fast-forward reproduction is commanded (YES in #2), the system control unit 11 decides whether or not the video and audio file to be reproduced at a fast-forward speed at this time is the same as a video and audio file having been reproduced at a fast-forward speed at a previous time (#3). If the video and audio file at this time is the same as the video and audio file having been reproduced at the fast-forward speed at the previous time (YES in #3), then the system control unit 11 decides whether or not the fast-forward speed at this time is the same as the fast-forward speed at the previous time (#4).

If the fast-forward speed at this time is the same as the fast-forward speed at the previous time (YES in #4), namely if at this time the same video and audio file as that at the previous time is reproduced at the same fast-forward speed as that at the previous time, then the system control unit 11 increments value of n by "1" (#5). The value of n indicates the number of times to repeat the fast-forward reproduction of the same video and audio file at the same fast-forward speed, and is stored in an internal memory of the system control unit 11. The initial value of n is set as "0".

Subsequently, based on the data indicating series of periodic reference reproduction zones and on the data indicating a shift amount, both data being stored in the fast-forward reproduction memory 9, the system control unit 11 starts fast-forward reproduction at the fast-forward speed in a manner: that a series of periodic reproduction zones, which is equivalent to, and is shifted by an amount of n multiple of the predetermined shift amount Δ from, the series of periodic reproduction zones corresponding to the fast-forward speed, is used for the fast-forward reproduction zones; namely that a series of periodic reproduction zones, which is equivalent to and is shifted by the predetermined shift amount Δ from the series of periodic reproduction zones used at the previous time, is used for the fast-forward reproduction zones at this time (#6). Accordingly, in the case where a fast-forward reproduction of the same video and audio file as that reproduced at the previous time is performed at this time at the same fast-forward speed as that at the previous time, it is realized that video images and audio sounds reproduced by the fast-forward reproduction at this time are free from overlap with the video images and audio sounds reproduced by the fast-forward reproduction at the previous time.

It is to be noted here that when the command of the fast-forward reproduction is performed during reproduction of video images and audio sounds in a video and audio file, the fast-forward reproduction is started from a fast-forward reproduction zone which is closest to the reproduction position in the video and audio file at the time the fast-forward reproduction is commanded. On the other hand, when the command of the fast-forward reproduction is performed during stoppage of the reproduction of video images and audio sounds in a video and audio file, the fast-forward reproduction is started from a fast-forward reproduction zone which is closest to the starting position of the video and audio file.

It is also to be noted that when the shift amount reaches a given value in the above-described process #6 (for example when the shift amount reaches a length of each zone of the video and audio file to be skipped), the fast-forward reproduction is started in a manner that the series of periodic reference reproduction zones corresponding to the fast-forward speed is used for the fast-forward reproduction zones (namely that the value of n is set as "0").

Meanwhile, if the video and audio file at this time is different from the video and audio file having been reproduced at the fast-forward speed at the previous time (NO in #3), or if the fast-forward speed at this time is different from the fast-forward speed at the previous time (NO in #4), then the system control unit 11 sets the value of n as "0" (#7). Subsequently, based on the data indicating series of periodic reference reproduction zones stored in the fast-forward reproduction memory 9, the system control unit 11 starts fast-forward reproduction at the fast-forward speed at this time in a manner that the series of periodic reference reproduction zones corresponding to the fast-forward speed at this time is used for the fast-forward reproduction zones (#8). Since each series of periodic reproduction zones corresponding to each fast-forward speed is so set as to be free from overlap with the other series of periodic reproduction zones corresponding to the other fast-forward speeds, it is realized that video images and audio sounds reproduced by the fast-forward reproduction at this time are free from overlap with video images and audio sounds reproduced by the fast-forward reproduction at the previous time, not only in the case where the video and audio file for the fast-forward reproduction at this time is different from that at the previous time, but also in the case where the fast-forward speed for this time is different from that for the previous time.

It is to be noted here that when the command of the fast-forward reproduction is performed during reproduction of video images and audio sounds in a video and audio file, the fast-forward reproduction is started from a fast-forward reproduction zone which is closest to the reproduction position in the video and audio file at the time the fast-forward reproduction is commanded. On the other hand, when the command of the fast-forward reproduction is performed during stoppage of the reproduction of video images and audio sounds in a video and audio file, the fast-forward reproduction is started from a fast-forward reproduction zone which is closest to the starting position of the video and audio file.

After the fast-forward reproduction is started by the above-described process #6 or #8, the system control unit 11 continues the fast-forward reproduction (#11) in the case where command to cancel the fast-forward reproduction is not performed by the remote control 7 (NO in #9), or where the fast-forward reproduction position does not reach the end of the video and audio file (NO in #10). When the command to cancel the fast-forward reproduction is performed (YES in #9), or the fast-forward reproduction position reaches the end of the video and audio file (YES in #10), the fast-forward reproduction is ended (#12).

According to the hard disk recorder 1 having such configuration, in the case where a fast-forward reproduction, at each time, of the same video and audio file as that reproduced at the previous time is performed at the same fast-forward speed as that at the previous time, it is realized that video images and audio sounds reproduced by the fast-forward reproduction at the each time are free from overlap with the video images and audio sounds reproduced by the fast-forward reproduction at the previous time, while video images not reproduced by the fast-forward reproduction at the previous time are reproduced by the fast-forward reproduction at the each time. Furthermore, each time a further fast-forward reproduction of the same video and audio file is repeated at the same speed, it is realized that video images and audio sounds reproduced thereby are shifted in the reproduction zones by a predetermined shift amount from video images and audio sounds reproduced at the previous time. On the other hand, each time a fast-forward reproduction of the same video and audio file as that reproduced at the previous time is performed at a fast-forward speed different from that at the previous time, it is also realized that video images and audio sounds reproduced by the fast-forward reproduction at the each time are free from overlap with the video images and audio sounds reproduced by the fast-forward reproduction at the previous time, while video images not reproduced by the fast-forward reproduction at the previous time are reproduced by the fast-forward reproduction at the each time. Thereby, a target scene can be quickly and easily searched.

It is to be noted that the present invention is not limited to such configurations as in the above-described embodiment, and various modifications are possible. For example, in the above-described embodiment, it is possible to omit the processes #3 to #7, and perform the process #8 always at each fast-forward reproduction. In the case of such configuration, each series of periodic reference reproduction zones corresponding to each fast-forward speed for each fast-forward reproduction is used for the reproduction zones at the each fast-forward reproduction, regardless of whether or not the video and audio file and the fast-forward speed at each time are the same as those at the previous time.

As described in the above embodiment, each series of periodic reproduction zones corresponding to each fast-forward speed is set to be free from overlap with the other series of periodic reproduction zones corresponding to the other fast-forward speeds. By such configuration as well, it is realized that when video images and audio sounds are reproduced by fast-forward reproductions from the same video and audio file at different fast-forward speeds, such video images and audio sounds reproduced by one of the fast-forward reproductions are free from overlap with those by another of the fast-forward reproductions. Thereby, a target scene can be quickly and easily searched.

In the above-described embodiment, it is possible to omit the process #3. In this case and in the case where the fast-forward speed at each time is the same as that at the previous time, a series of fast-forward reproduction zones at the each time is made equivalent to and is shifted by a predetermined shift amount Δ from a series of fast-forward reproduction zones at the previous time, regardless of whether or not the video and audio file at the each time is the same as that at the previous time. By such configuration as well, it is realized that when fast-forward reproduction is repeated at the same fast-forward speed, video images and audio sounds reproduced by one fast-forward reproduction are free from overlap with those by a further fast-forward reproduction, even if the video and audio file at the one fast-forward reproduction is the same as at the further fast-forward reproduction. Thereby, a target scene can be quickly and easily searched.

In the above-described embodiment, the fast-forward speeds of three kinds, 120×, 60× and 30×, are exemplified, but instead can be of four kinds or more. It is also possible to use a single speed instead of the plural kinds of speeds. In the case of the single speed, a desired result can be obtained by omitting the process #4 in the above-described embodiment. By such configuration as well, each time a fast-forward reproduction of the same video and audio file is repeated, a series of fast-forward reproduction zones at the each time is made equivalent to and is shifted by a predetermined shift amount Δ from a series of fast-forward reproduction zones at the previous time. Thus, video images and audio sounds reproduced by each time fast-forward reproduction are free from overlap with those by the previous time fast-forward reproduction. Thereby, a target scene can be quickly and easily searched.

In the above-described embodiment, the reference time interval of 1 second is exemplified, but instead can be e.g. 0.5 second or 2 seconds. It is also possible to use different reference time intervals for different fast-forward speeds, respectively. Furthermore, the series of periodic reference reproduction zones are not limited to those as exemplified in the above-described embodiment, but can be any series of periodic reference reproduction zones as long as one series of periodic reference reproduction zones corresponding to one fast-forward speed is free from overlap with the other series of periodic reference reproduction zones corresponding to the other fast-forward speeds. For instance, the series of periodic reference reproduction zones corresponding to the 60× speed can be so set as to be positioned at midpoint of each reference reproduction zone corresponding to the 120× speed, and at a point positioned backward or forward by a given amount (e.g. about 3 seconds) from each reference reproduction zone corresponding to the 120× speed. Likewise, the series of periodic reference reproduction zones corresponding to the 30× speed can be so set as to be positioned at midpoint of each reference reproduction zone corresponding to the 60× speed, and at a point positioned backward or forward by a given amount (e.g. about 3 seconds) from each reference reproduction zone corresponding to the 60× speed. Besides, the shift amount to shift each series of periodic reference reproduction zones is not limited to such 5 seconds as exemplified in the above-described embodiment, but can be e.g. 1 second or 10 seconds. It is also possible to use different shift amounts for different fast-forward speeds, respectively.

In addition, the present invention can be applied to various video reproducing apparatus such as DVD (digital video disk) players that can reproduce video images, as well as to audio reproducing apparatus such as CD (compact disk) players that can reproduce only audio sounds, not limiting to hard disk recorders. As for the DVD players, fast-forward reproductions similar to those as described in the above-embodiment are to be applied to video images and audio sounds for reproduction from the DVD players, while as for the CD players, fast-forward reproductions similar to those as described in the above-embodiment are to be applied to audio sounds for reproduction from the CD players.

This application is based on Japanese patent application 2003-163209 filed in Japan dated Jun. 9, 2003, the contents of which are hereby incorporated by references.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A hard disk recorder comprising:
reading means to read video image-related data from a recording medium having, as image-related information files, series of the video image-related data recorded thereon;
video signal generating means to generate video signals for reproduction of video images on a display on the basis of the video image-related data read by the reading means; and
a system control unit to not only control the reading means and the video signal generating means for reproducing the video images on the display, but also perform a fast-forward reproduction of the video images in a series of periodic reproduction zones at a fast-forward speed, each periodic reproduction zone being for a predetermined reference time interval, while video images in other than the periodic reproduction zones are skipped according to a ratio of the fast-forward speed to the predetermined reference time interval,
wherein when the system control unit performs a first time fast-forward reproduction of the video images in a first series of periodic reproduction zones at a first fast-forward speed, and thereafter performs, at the same fast-forward speed, a second fast-forward reproduction of the video images in a second series of periodic reproduction zones, then the system control unit automatically makes the second series of periodic reproduction zones be free from overlap with the first series of periodic reproduction zones.

2. The hard disk recorder according to claim 1, wherein when the second time fast-forward reproduction of the video images is performed at the same fast-forward speed as that in the first time fast-forward reproduction, the second series of periodic reproduction zones is equivalent to and is shifted in position by a predetermined shift amount from the first series of periodic reproduction zones.

3. The hard disk recorder according to claim 2, wherein the system control unit is capable of performing the fast-forward reproduction of the video images at a fast-forward speed selected from plural fast-forward speeds.

4. The hard disk recorder according to claim 3, which further comprises a fast-forward reproduction memory to preliminarily store data indicating plural series of periodic reference reproduction zones for fast-forward reproduction of the video images, respectively, each periodic reference reproduction zone in each series of periodic reference reproduction zones being for the reference time interval, wherein each of the plural series of periodic reference reproduction zones is set with a starting position of each of the video image-related information files being used as a base point, wherein the plural series of periodic reference reproduction zones are set corresponding to the plural fast-forward speeds, respectively, in a manner that the plural series of periodic reference reproduction zones are free from overlap with one another, and wherein the system control unit performs the fast-forward reproduction of the video images at a fast-forward speed selected from the plural fast-forward speeds in one of the plural series of periodic reference reproduction zones which is stored in the fast-forward reproduction memory and which corresponds to the selected fast-forward speed, each periodic reproduction zone in the one of the plural series of periodic reference reproduction zones being for the reference time interval.

5. The hard disk recorder according to claim 1, wherein the system control unit is capable of performing the fast-forward reproduction of the video images at a fast-forward speed selected from plural fast-forward speeds.

6. A hard disk recorder comprising:

reading means to read video image-related data from a recording medium having, as image-related information files, series of the video image-related data recorded thereon;

video signal generating means to generate video signals for reproduction of video images on a display on the basis of the video image-related data read by the reading means;

a system control unit to not only control the reading means and the video signal generating means for reproducing the video images on the display, but also perform a fast-forward reproduction of the video images in a series of periodic reproduction zones at a fast-forward speed, each periodic reproduction zone being for a predetermined reference time interval, while video images in other than the periodic reproduction zones are skipped according to a ratio of the fast-forward speed to the predetermined reference time interval;

operating means to be operated by a user to command a fast-forward reproduction of the video images in an arbitrary one of the video image-related information files recorded on the recording medium; and a fast-forward reproduction memory to preliminarily store data indicating plural series of periodic reference reproduction zones for fast-forward reproduction of the video images, respectively, each periodic reference reproduction zone in each series of periodic reference reproduction zones being for the reference time interval, wherein the system control unit is capable of performing the fast-forward reproduction of the video images at a fast-forward speed selected from plural fast-forward speeds, wherein each of the plural series of periodic reference reproduction zones is set with a starting position of each of the video image-related information files being used as a base point, wherein the plural series of periodic reference reproduction zones are set corresponding to the plural fast-forward speeds, respectively, in a manner that the plural series of periodic reference reproduction zones are free from overlap with one another, and wherein [1] in the case where, after a first time fast-forward reproduction of the video images in one of the video image-related information files at first one of the fast-forward speeds, a second time fast-forward reproduction of the video images in the same one of the video image-related information files at an arbitrary one of the fast-forward speeds is commanded by the operating means, then:

(i) in the case where the arbitrary one of the fast-forward speeds in the commanded second time fast-forward reproduction is a second one, different from the first one, of the fast-forward speeds, the system control unit automatically performs the second time fast-forward reproduction of the video images at the second one of the fast-forward speeds in one of the plural series of periodic reference reproduction zones which corresponds to the second one of the fast-forward speeds, each periodic reproduction zone in the one of the plural series of periodic reference reproduction zones being for the reference time interval; or (ii-a) in the case where the arbitrary one of the fast-forward speeds in the commanded second time fast-forward reproduction is the same as the first one of the fast-forward speeds, the system control unit automatically performs the second time fast-forward reproduction of the video images at the same speed as the first one of the fast-forward speeds in a second series of periodic reference reproduction zones being equivalent to and being shifted in position by a predetermined shift amount from the one of the plural series of periodic reference reproduction zones which corresponds to the first one of the fast-forward speeds, each periodic reproduction zone in the second series of periodic reference reproduction zones being for the reference time interval, and (ii-b) in the case where, after the second time fast-forward reproduction of the video images in the same one of the video image-related information files at the same one of the fast-forward speeds as in the second time fast-forward reproduction, a further time fast-forward reproduction of the video images in the same one of the video image-related information files at the same one of the fast-forward speeds is repeatedly commanded by the operating means, then the system control unit automatically performs the further time fast-forward reproduction of the video images at the same one of the fast-forward speeds in a further series of periodic reference reproduction zones which is equivalent to the second series of periodic reference reproduction zones and which is further shifted in position by the predetermined shift amount from the second series of periodic reference reproduction zones, each periodic reproduction zone in the further series of periodic reference reproduction zones being for the reference time interval, or wherein [2] in the case where, after a first time fast-forward reproduction of the video images in one of the video image-related information files, a second time fast-forward reproduction of the video images in a second one, different from the first one, of the video image-related information files at a further arbitrary one of the fast-forward speeds is commanded by the operating means, then the system control unit automatically performs the second time fast-forward reproduction of the video images at the further arbitrary one of the fast-forward speeds in one of the plural series of periodic reference reproduction zones which corresponds to the further arbitrary one of the fast-forward speeds, each periodic reproduction zone in the one of the plural series of periodic reference reproduction zones being for the reference time interval.

* * * * *

UNITED STATES PATENT AND TRADEMARK OFFICE
CERTIFICATE OF CORRECTION

PATENT NO. : 7,596,299 B2  Page 1 of 1
APPLICATION NO. : 10/863199
DATED : September 29, 2009
INVENTOR(S) : Takagi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1512 days.

Signed and Sealed this

Twenty-eighth Day of September, 2010

David J. Kappos
*Director of the United States Patent and Trademark Office*